(12) United States Patent
Fatiuk et al.

(10) Patent No.: US 11,490,477 B2
(45) Date of Patent: Nov. 1, 2022

(54) ELECTRONIC CONTROLLER APPARATUS AND CONTROL METHOD

(71) Applicant: SIGNIFY HOLDING B.V., Eindhoven (NL)

(72) Inventors: Oleksandr Fatiuk, Eindhoven (NL); Miroslav Ilic, Liberty Grove (AU); Ratko Milosavljevic, Gymea Bay (AU)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/287,130

(22) PCT Filed: Oct. 22, 2019

(86) PCT No.: PCT/EP2019/078661
§ 371 (c)(1),
(2) Date: Apr. 21, 2021

(87) PCT Pub. No.: WO2020/083876
PCT Pub. Date: Apr. 30, 2020

(65) Prior Publication Data
US 2021/0392727 A1    Dec. 16, 2021

(30) Foreign Application Priority Data

Oct. 25, 2018 (EP) ..................... 18202638

(51) Int. Cl.
*H05B 45/14* (2020.01)
*H02J 3/00* (2006.01)
(Continued)

(52) U.S. Cl.
CPC ............... *H05B 45/14* (2020.01); *H02J 3/00* (2013.01); *H02J 3/14* (2013.01); *H02M 1/0045* (2021.05)

(58) Field of Classification Search
CPC .... H05B 45/14; H05B 47/19; H05B 45/3725; H05B 45/10; H05B 45/38; H02J 3/005;
(Continued)

(56) References Cited

U.S. PATENT DOCUMENTS 9,961,749 B1    5/2018 Lee et al.
2008/0054728 A1*  3/2008 Watson ............... H05B 45/10
307/130
(Continued)

FOREIGN PATENT DOCUMENTS

GB          2491550 A    12/2012
JP      2009-530773 A     8/2009
(Continued)

*Primary Examiner* — Abdullah A Riyami
*Assistant Examiner* — Syed M Kaiser
(74) *Attorney, Agent, or Firm* — Daniel J. Piotrowski

(57) ABSTRACT

An electronic controller apparatus comprises a controller circuit for controlling an external load and a power supply circuit to power the controller circuit. A switch is adapted to alternately be conductive to bypass the power supply circuit from the input or allow the power supply circuit to obtain power from the input. A linear operation of the switch is used to reduce current and voltage waveform distortion when power is being obtained from the input.

15 Claims, 6 Drawing Sheets

(51) Int. Cl.
*H02J 3/14* (2006.01)
*H02M 1/00* (2006.01)

(58) Field of Classification Search
CPC ............ H02J 3/14; H02J 5/00; H02M 1/0006; H02M 7/219; H02M 7/2195; H02M 1/0085; H02M 1/0045; Y02B 20/30
See application file for complete search history.

(56) References Cited

U.S. PATENT DOCUMENTS

| | | | |
|---|---|---|---|
| 2016/0149496 A1* | 5/2016 | Papismedov | H02M 1/083 363/21.17 |
| 2017/0271904 A1 | 9/2017 | Ziv | |
| 2018/0034270 A1* | 2/2018 | Jutras | H02J 3/14 |

FOREIGN PATENT DOCUMENTS

| | | | | |
|---|---|---|---|---|
| TW | I321307 B | | 3/2010 | |
| WO | WO-2011016860 A1 | * | 2/2011 | ............... G09G 3/32 |
| WO | WO-2015198448 A1 | * | 12/2015 | ............. H02J 9/062 |
| WO | 2017190999 A1 | | 11/2017 | |
| WO | WO-2017190999 A1 | * | 11/2017 | |

\* cited by examiner

ELECTRONIC CONTROLLER APPARATUS AND CONTROL METHOD

CROSS-REFERENCE TO PRIOR APPLICATIONS

This application is the U.S. National Phase application under 35 U.S.C. § 371 of International Application No. PCT/EP2019/078661, filed on Oct. 22, 2019 which claims the benefit of European Patent Application No. 18202638.5, filed on Oct. 25, 2018. These applications are hereby incorporated by reference herein.

FIELD OF THE INVENTION

This invention generally relates to a controller apparatus and a method for powering such an apparatus, for example for use in controlling a lighting apparatus, such as a lamp, luminaire, tubular luminaire, LED module or LED driver.

BACKGROUND OF THE INVENTION

There is an increasing use of LEDs as individual lamps or in luminaires, and which can perform additional functions beyond simple on-off control.

On-off control is typically achieved with a simple switch in series with the lighting load. The switch is in series with the mains power live line before it connects to the lighting load.

The most basic additional functionality to simple on-off control is to provide dimming control. Traditional incandescent light bulbs make use of phase-cut power approaches, and phase cut dimmer switches are used for this purpose. They may operate according to a leading edge phase cut approach or a trailing edge phase cut approach.

Lamps and luminaires with wireless radio frequency (RF) control functions, using an on-board radio modem, are becoming more popular, so that there is a trend towards wireless controllable lamps.

The wireless communication usually takes place between the lighting load (e.g. lamp) and a bridge, often known as a hub. The hub is preferably provided as a two-wire device to fit existing electrical installations so that it can be provided as a retrofit solution. The hub is then connected in series with the load, and it has to be powered in order to operate.

The lighting load has to be permanently powered by the mains to enter a standby mode, enabling its internal RF receiver to remain powered to receive messages sent by the transmitter located at the mains switch. The mains switch is thus always operated and when the lighting load is not delivering light, a standby current is drawn from the mains. Thus, the lighting load either draws a standby current to power the RF/controlling portion, or an operating current to emit light as well as power the RF/controlling portion, which operating current is typically at least ten times as large as the standby current.

The lighting load for example is controllable via ZLL, WiFi or Bluetooth wireless communication.

Powering of the mains switch, otherwise known as a "wall unit", which communicates wirelessly with the lighting load, can be implemented with batteries or other energy storage or energy harvesting technologies. Batteries have a limited lifetime and energy leakage during periods of non-use. Thus, it is also preferred to tap energy from the mains power supply for powering the wall unit.

Phase-cut powering provides one option for deriving energy from the power supply, during times when the input signal is cut from the lighting load and provided to the wall unit.

FIG. 1 shows the shape of a current or voltage waveform delivered to a load if a known phase-cut powering wall unit is used. During a part of the cycle of the phase cut signal, the load current is conducted, and for another part of the cycle the energy is extracted to power up the wall unit. This portion can be significant, undesirably limiting the amount of energy delivered to load. As seen by the load, the power received is phase-cut.

In some lighting systems, the lamp is not phase-cut compatible, because the lamp is incompatible with the resulting waveform of the output voltage, which is severely disrupted. There are other appliances which are not phase-cut compatible, especially those appliances which are not resistive. As smart devices become more popular, not all of those appliances may be compatible with a phase-cut wall unit.

Furthermore, phase-cut powering often gives poor performance with LED lamps due to difficulties with zero-crossing detection of a capacitive load such as an LED. High levels of conducted emissions result giving the need for filter components.

When the lamp being controlled is off and drawing only a standby current, the current is very small and also it must be maintained passing through the lamp to keep the lamp and the control panel powered up. When the lamp is on, the control panel must conduct the full current required to power up the lamp and extract enough energy to power up the control panel with minimum voltage waveform disruption and low heat dissipation.

These issues present difficulties in designing a controller apparatus which is able to draw power from the main power supply without interruption to the current flowing to the load (such as a lamp), and hence allowing compatibility with different load types, such as different types of lamp.

WO2017190999A1 discloses a bypass switch in a controller operates in a very low current mode due to transistor amplification.

SUMMARY OF THE INVENTION

Embodiments of the invention basically aim to solve the above-mentioned problem of phase-cut powering to an external load, especially a lamp. The phase cut powering also causes EMI due to the hard switching. Embodiments of the invention would also aim to solve the EMI problem.

It is a concept of the invention to provide a circuit for connection in series with a power supply, wherein the circuit uses a switch for selectively bypassing the power supply circuit or coupling the input AC power supply to a power supply circuit with a linear and parallel circuit so that the AC power supply continues without interruption. When the AC supply delivers sufficient current, there is continuous powering of the external load so that the external load is not supplied with phase-cut power during the operation. The switch operates for at least a period of time in a linear state when the power supply circuit is retrieving power from the input. The impact of the switching on the output voltage waveform is thereby reduced.

The invention is defined by the claims.

According to examples in accordance with an aspect of the invention, there is provided an electronic controller apparatus, adapted to connect in series with an AC supply and an external load, the apparatus comprising:

a controller circuit for controlling the external load;

a power supply circuit to power the controller circuit, comprising an AC input for receiving energy, wherein said AC input is adapted to connect in series with the AC supply and the external load; and a switch connected across the AC input and in parallel with the power supply circuit, adapted alternately to be conductive to bypass the power supply circuit from the AC input or to allow the power supply circuit to obtain power from the AC input, wherein for a first type of AC supply of a sufficient operating current, the switch is adapted to continue a current of said first type of AC supply by alternately:

being fully conductive; and operating in a linear state to allow the power supply circuit to obtain power from the AC input, thereby to allow the sufficient current to flow continuously from said first type of AC supply and through the external load.

In parallel with the power supply circuit means that when the switch is fully conductive, the power supply circuit no longer receives energy via the switch. By "continue said . . . supply" is meant to act as a connection to allow the energy supply to continue to flow (e.g. to an AC output from which energy is delivered). Similarly, "flow continuously from said first type of AC supply" means that the current flows from the AC input to an AC output without interruption.

The controller apparatus is powered by energy received at an input which is processed by a power supply circuit. The energy received is regulated by the operation of the switch, which is alternated between a conductive state during which time no energy is received by the power supply circuit, and a state in which energy is obtained but also another portion of the energy is allowed to flow through the linear switch. The switch operates in a linear state when retrieving power for at least a first type of AC input, which is for example an input which provides a large current to the power supply circuit. Thus, the first type of AC input for example comprises a current which exceeds a threshold for the operating of the external load for examples in which the energy flow is used to power that external load (as well as the controller circuit being for controlling that external load).

The power supply circuit is charged from the input and discharges to the controller circuit, so that there is a cyclic charging and discharging of the power supply circuit, for example by using a capacitor in parallel with the controller circuit. By operating in a linear state, the impact of the switching on the output voltage/current waveform is reduced, for example the voltage/current waveform is much less distorted than results from a phase cut approach. Reduced distortion of the output voltage waveform in turn results in reduced distortion of the voltage waveform at the input and hence reduced distortion experienced by circuits or the external load itself upstream of the controller apparatus. The waveform would be compatible with the external load. Further, the reduced distortion of the output voltage waveform also reduces EMI.

Although a linear mode of operation results in increased power consumption since energy is dissipated by the switch, this may be arranged to take place only for short durations within the overall cycle.

The switch is for example implemented as one or more transistors. When operating in the linear mode, the current flowing through the switch can be regulated in an analog manner instead of switching between bistable states. This analog adjustment results in reduced distortion compared to a hard switching approach (i.e. completely on/off).

The apparatus may comprise a rectifier for rectifying the AC input before delivery to the power supply circuit, and the power supply circuit comprises at least one of:

a storage capacitor;

a linear power supply; and a switched mode power supply.

The power supply circuit is thus for generating a DC supply for example for providing power to the controller in the form of an integrated circuit such as a microprocessor and to RF devices. Different power supply circuits are possible depending on the practical need.

The power supply circuit may be connected in series with the external load via the AC input, and said controller circuit is for controlling the external load.

Thus, the AC input, such as an AC current, is received from or delivered to the external load. The switching approach is compatible with an AC input provided by or delivered to an external load which is not compatible with a phase cut AC signal, such as a phase cut power signal for an external load in the form of a lamp. The power supply circuit is able to be connected in series along a single power supply line. This provides a replacement to the traditional switch which also supports a non-phase cut lamp.

The AC current of the external load for example comprises, for different modes of the external load, a standby current of the external load and an operating current of the external load which is larger than the standby current, and wherein said operating current comprises said first type of AC supply.

The operating current is preferably at least ten times larger than the standby current.

When a large operating current is being delivered by the external load, switching between conducting and non-conducting switch states will create significant disturbance to the output voltage waveform. This is reduced by operating the switch in the linear mode. The current drop when the switch is in the linear mode could at most be a few percent, such as 1% to 5% less than the current when the switch is fully conductive. Thus, the operating current to the external load is substantially maintained.

For the first type of AC supply, the switch is for example adapted to alternate between:

the fully conductive state when an output voltage of the power supply circuit reaches an upper threshold, such that the power supply circuit is bypassed from the AC input; and the linear state in which the power supply circuit is adapted to obtain a portion of the operating current from the AC input while the switch allows a rest of the operating current to flow through when the output voltage of the power supply reaches a lower threshold.

This alternation provides maintaining the operating current according to the cyclic charging of the power supply circuit and discharging through the controller circuit.

For the first type of AC supply, the duration of the conductive state is preferably larger than the duration of linear state.

When a large operating current is received, a small period of time is present while the large available current passes to charge the power supply circuit to charge it sufficiently. Thus, the conductive state is used most of the time, and the switch is turned fully on during this time. This linear control is for relatively short durations hence limiting power dissipation. The operating current is maintained while during this linear control.

When the AC current is the standby current, as a second type of AC supply, the switch is then preferably adapted to alternate between:

a fully conductive state when an output voltage of the power supply circuit reaches an upper threshold, such that the power supply circuit is bypassed from the AC input; and the linear state and a fully non-conductive state when the output voltage of the power supply reaches a lower threshold, to allow the power supply circuit to obtain power from the AC input, wherein the duration of the fully conductive state is smaller than the duration of the linear state and the fully non-conductive state.

When a small standby current is received, the switch is turned fully off to allow all the available current to pass to and charge the power supply circuit. It needs a long time to charge the power supply circuit. Retrieving power from the AC input thus involves turning fully off the switch. The power supply circuit is in series with the external load, and this does not change the small standby current as they are both high impedance, thus there is no need to prevent the switch from entering the fully non-conductive state. As a result of the small current, when switching to the fully non-conductive state, there will still be a short period of linear control, but the switch will nevertheless typically reach a fully non-conductive state. Most of the time, the small current is provided to the power supply circuit during the fully non-conductive state. When the voltage on the supply circuit is high enough, the switch enters the fully conductive state for a short while. A period of operating in the linear state happens between the transitions.

A feedback circuit may be provided for controlling the switch to alternate between the different states.

This feedback circuit sets the operating voltages and currents of the switch to provide the desired operation in the linear mode, i.e. with analogue control of the current flowing through the switch to provide a gradual transition between the conducting and non-conducting states of the switch.

The feedback circuit may comprise:

a voltage sensing circuit to sense a voltage output of the power supply circuit;

a comparing circuit to compare the sensed voltage with a reference voltage and output a voltage level to operate the switch in the different states; and a buffering component in a feedback path of the comparing circuit, wherein said buffering component is adapted to generate a slew rate to the voltage level to the switch.

Thus, voltage feedback control is used to maintain a voltage of the power supply circuit while also manipulating the switch. The buffering component is used to buffer the output voltage level to a higher level during the transition from not charging the supply circuit to charging the supply circuit, in order to maintain the voltage level in a linear threshold voltage of the switch, so that operation in the linear state is maintained for at least a certain duration. It is used to control the slew rate and hence timing of the voltage signals.

For the first type of AC supply, the buffering component may be adapted to generate the slew rate such that the voltage level is kept in a control voltage range of the linear state before the power supply circuit is sufficiently charged by a portion of the operating current. In this case, the buffering component is adapted according to the amplitude of the first type of AC supply so that a linear period of the switch can be ensured.

For the second type of AC supply, the slew rate may be adapted to allow the voltage level to enter a control voltage range of the fully non-conducive state before the power supply circuit is sufficiently charged by the standby current. In this case, the linear period is shorter than the time to sufficiently charge the power supply circuit using the small standby current, thus the switch will enter the fully non-conductive state to stop the power dissipation of the linear state when charging the power supply circuit.

For these purposes, the buffering component may comprise a capacitor with capacitance in the range 22 nF to 220 nF connected between the output of the comparing circuit and the reference voltage.

These capacitance values are suitable for controlling the amount of linear control of the switch, which influences the overall circuit performance.

The external load for example comprises a lamp having the standby mode without light emission and the operating mode with light emission.

The input for example may be an AC current of mA or tens of mA magnitude during the standby mode and magnitude of Amps during the operating mode.

The controller may comprise an RF transmission circuit for providing RF control signals to the external load.

The controller circuit is thus for controlling the external load from which the current is received. The apparatus is for example for replacing a light switch to provide a control panel with additional functionality compared to the replaced on/off light switch. The controller circuit may be used to communicate with other devices as well.

The invention also provides a lighting system comprising:

an AC lamp, having a standby mode without light emission and an operating mode with light emission; and an apparatus as defined above in series with the lamp and adapted to control a mode of the lamp, wherein the lamp comprises the external load, and thereby receives as the AC input an AC lamp current.

The invention also provides a method of powering a controller circuit which is for controlling an external load, wherein the controller circuit is adapted to connect in series with an AC supply and the external load, the method comprising:

receiving energy at an AC input of a power supply circuit, wherein said AC input (14, 16) is adapted to connect in series with the AC supply (10) and the external load (18); and in a cycle, alternately setting a switch connected across the AC input to be conductive to bypass the power supply circuit from the AC input and setting the switch to allow the power supply circuit to obtain power from the AC input, wherein when allowing the power supply circuit to obtain power from the AC input, for a first type of AC supply of a sufficient operating current, the method comprises operating the switch to continue a current of said first type of AC supply by alternately:

being conductive; and operating in a linear state to allow the power supply circuit to obtain power from the AC input, thereby to allow the sufficient current to flow continuously from said first type of AC supply and through the external load.

The method may comprise receiving energy as an AC current of the external load, and wherein the AC current comprises for different modes of the external load a standby current of the external load and an operating current of the external load which is larger than the standby current, wherein the method comprises alternating the setting of the switch between a conductive state, such that the power supply circuit is bypassed from the AC input, and a control state in which the power supply circuit obtains power from the AC input, wherein when the AC current is a standby current, the duration of the conductive state is smaller than the duration of the control state, and the control state is a fully non-conductive state, and when the AC current is a load operating current, the duration of the conductive state is larger than the duration of the control state, and the control state comprises said operation of the switch in the linear state.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
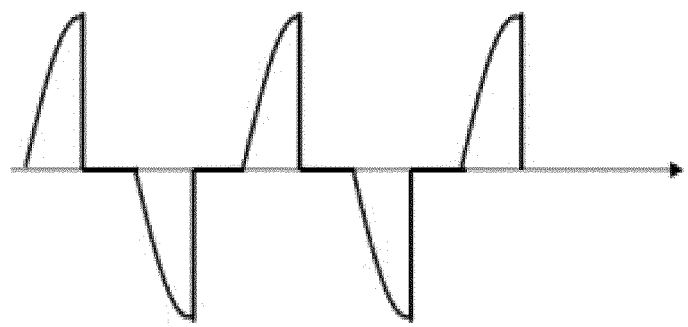
FIG. 1 shows the shape of a current or voltage waveform delivered to a load if a known phase-cut powering wall unit is used.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an electronic controller apparatus comprises a controller circuit for controlling an external load and a power supply circuit to power the controller circuit. A switch is adapted to alternately be conductive to bypass the power supply circuit from the input or allow the power supply circuit to obtain power from the input. A substantially long linear operation of the switch is used to reduce current and voltage waveform distortion when operating power is being obtained from the input.

The invention will be described with reference to the preferred application of the invention, as a control switch to be provided at a light switch, to implement wireless control of the light which was previously controlled by a basic wired light switch. However, the invention may be applied to a switch for powering other types of electric device, by replacing wired on-off control with wireless control functionality. Furthermore, the circuit powered by the second output voltage may be for controlling devices other than the load which is powered through the switch. Thus, the invention is not limited to the control of the load which is supplied with power through the switch. It may be used to control other devices as well or instead of the load which receives power through the switch.

Figure 2:
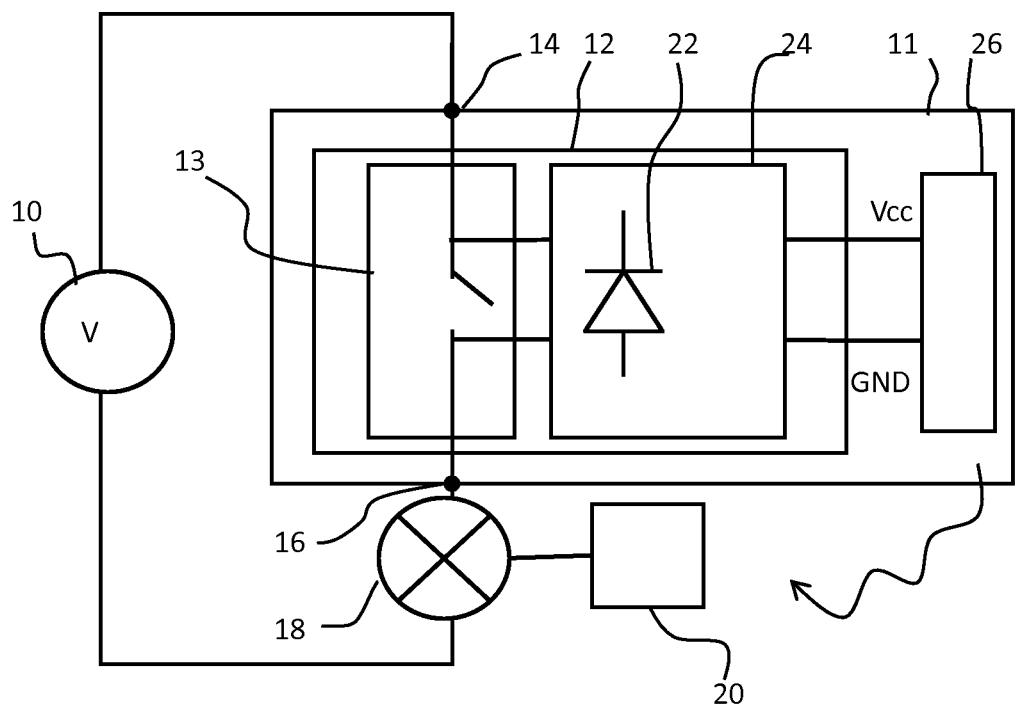
FIG. 2 shows a lighting circuit.

FIG. 2 shows a lighting circuit. The circuit is powered by the mains, as represented by the voltage source 10. A single wire of the mains supply passes to an electronic controller apparatus 11 which includes an energy harvesting circuit 12 having a switch 13. The switch 13 either allows energy to pass to the remainder of the controller apparatus 11 or else bypasses the remainder of the controller apparatus.

The single wire is a mains live line. The electronic controller apparatus 11 thus has a power input terminal 14 for receiving power from an external power source and an output terminal 16 for connection to the load in the form of a lighting device 18.

The lighting device 18 includes a wireless receiver or transceiver 20 which is adapted to receive wireless control commands for the operation of the lighting device 18. The lighting device (e.g. a lamp) for example has a standby mode and an operating mode which can be set by wireless signals sent to the lighting device. The mode of operation of the lighting device determines the current that is drawn by the lamp from the supply. In addition, the lighting device may perform other functions such as temperature sensing, PIR sensing, humidity detection or video surveillance. The outputs from these devices may be provided wirelessly from the lighting device, and input control commands may be received wirelessly.

The lighting device is an AC lamp, which thus typically incorporates its own rectifier and driving circuit. The lamp does not need to support a phase cut input power.

The energy harvesting circuit 12 generates a DC output voltage. For this purpose, a power supply circuit 24 includes a rectifier 22. The output voltage from the power supply circuit 24 is provided to power a controller circuit 26 for controlling an external load. In this example, the controller circuit 26 is a wireless transmitter 26 for providing wireless control signals to the lighting device 18, which is then the controlled external load. The control signals for example control dimming, but they may control any other light output characteristics such as dynamic lighting modes or color control modes.

The terminals 14,16 define a two-terminal connection to which the electronic controller apparatus 11 is connected. Terminal 14 may be considered to be an AC input and terminal 16 may be considered to be an AC output. The switch 13 is connected across this input 14, 16 and is adapted either to be conductive to bypass the power supply circuit 24 from the input 14, 16 or else to allow the power supply circuit 24 to obtain power from the input 14, 16. It performs these functions in an alternating, cyclic manner.

When the switch is closed, energy flows from said AC input to the AC output without interruption.

For a first type of AC supply provided to the input 14, 16, which is of sufficient current to allow lighting (i.e. normal operation) of the lamp 18, the switch 13 is adapted to alternately be conductive thereby to flow through said first type of AC supply to the lighting load without extracting any energy for the power supply circuit, or to allow the power supply circuit to obtain power from the input by operating in a linear state without substantially degrading the sufficient current. Thus a main portion of the current still flows to the AC output through the switch and only a portion is tapped by the switch to flow to the power supply circuit.

There are various possible options for the power supply circuit 24, such as a storage capacitor, a linear power supply and a switched mode power supply.

Figure 3:
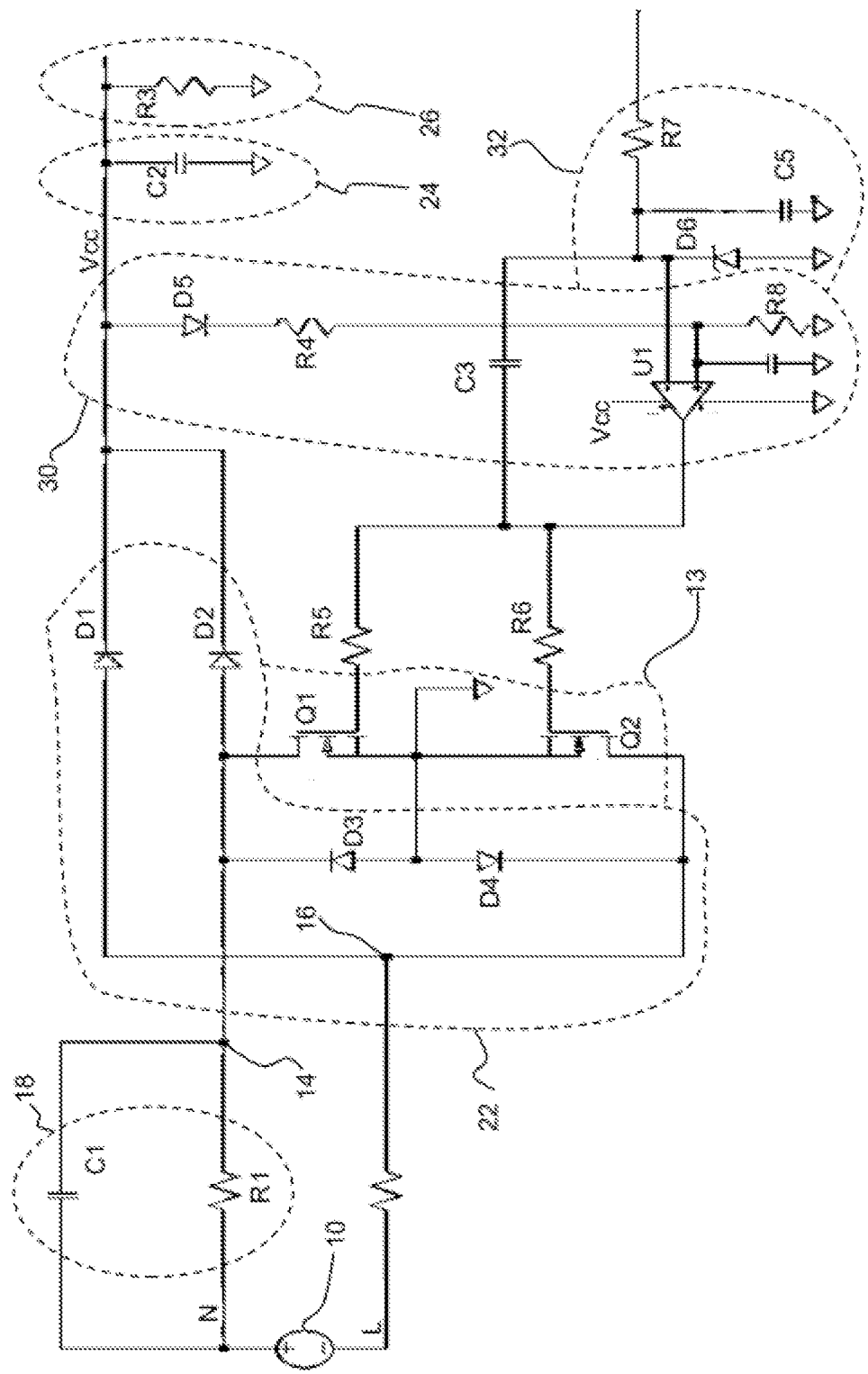
FIG. 3 shows an example of an implementation of the circuit of FIG. 2.

FIG. 3 shows an example of an implementation of the circuit of FIG. 2.

The lighting load 18 is represented by a resistor R1 and a capacitor C1 in parallel. The rectifier 22 is shown as a full bridge rectifier of diodes D1 to D4. The switch 13 is shown as two series MOSFETs Q1, Q2 across the input 14, 16. The two MOSFETs Q1, Q2 can shunt/short circuit the input 14, 16. The power supply circuit 24 is represented as a capacitor C2. Note that the power supply circuit 24 can further comprise a switch mode power supply or a linear power supply. The controller circuit 26 is represented by a resistor R3, simply to illustrate that the controller circuit consumes energy/current from the local voltage supply Vcc.

The controller apparatus 11 is thus powered by energy received at the input 14, 16 and this energy is processed by the power supply circuit 24 of the controller apparatus to create a suitable power supply for the controller circuit. The energy received is regulated by the operation of the switch 13, which is alternated between a conductive state during which time no energy is received by the power supply circuit 24, and a state in which energy is obtained.

The operation of the controller apparatus is dependent on the nature of the current flowing from the voltage source 10 to charge the power supply circuit, which in turn depends on the current demanded by the lighting device 18. This depends on an operating mode of the lighting device. During a standby mode, the lighting device may draw current of the order of ones or tens of mA whereas during normal operation, when delivering a light output, the current may be of the order of hundreds of mA or amps. The operating current is typically ten or more times as large as the standby current.

When the large input current is present, i.e. a current exceeding a threshold level which is between a maximum standby current and below a minimum operating current, the power supply circuit is charged intermittently from the input, and discharges intermittently to the controller circuit 26, so that there is a cyclic charging and discharging of the power supply circuit.

The linear state is used to reduce the impact of the switching on the output voltage waveform. When operating in the linear mode of the transistors Q1, Q2, the current flowing through the switch can be regulated in an analog manner instead of switching between bistable states. This analog adjustment results in reduced distortion compared to a hard switching approach, particularly when switching between conducting and non-conducting switch states when a large current is needed.

In order to distinguish between the different modes of the lighting device, the circuit of FIG. 3 comprises a feedback circuit 30 for controlling the switch 13 to alternate between the different states.

The feedback circuit 30 sets the operating voltages and currents of the switch to provide the desired operation in the linear mode, or in a fully conductive mode or in a fully non-conductive mode. In the linear mode, there is analogue control of the current flowing through the switch to provide a gradual transition between the conducting and non-conducting states of the switch.

The feedback circuit 30 comprises a voltage sensing resistor-divider circuit D5, R4, R8 to sense a voltage output of the power supply circuit 24. This resistor-divider circuit includes a diode D5 which is used to introduce hysteresis to the voltage threshold levels. This reduces the frequency of operation of the switch and thereby reduces heat dissipation.

The sensed voltage is provided to the non-inverting input of a comparing circuit (op-amp comparator) U1 which compares the sensed voltage with a reference voltage. The reference voltage is generated by a reference voltage circuit 32 having a Zener diode D6 supplied with the power supply circuit voltage Vcc through a filter R7, C5. The Zener diode voltage defines a constant reference even though Vcc fluctuates. The comparing circuit U1 outputs a voltage level to operate the switch in the different states, in particular it supplies the gate voltage for the two transistors Q1, Q2 through gate resistors R5, R6.

A buffering component in the form of a capacitor C3 is in a feedback path of the comparing circuit. This capacitor thus performs an integrating function and thereby generates a slew rate as well as a ramp up rate to the voltage levels used to switch the transistor gates.

In the normal operation of the lamp, when voltage on the power supply circuit is sufficient, the switch is kept in a fully conductive state, and the lamp operating voltage/current is normal, as determined by the mains AC voltage level and the lamp's own driver.

Voltage feedback control is used to maintain a desired voltage of the power supply circuit, such as 18V DC. When the voltage on the power supply circuit becomes insufficient, and the switch intends to transition from its fully conductive state to a fully non-conductive state, the buffering component C3 is used to buffer the output voltage level to a high level, in order to prevent the voltage level dropping below a threshold voltage of the switch, so that operation in the linear state is maintained without entering the fully non-conductive state. It is used to control the slew rate and hence timing of the voltage signals.

When the larger operating current is received at the input, the buffering component C3 creates a slew rate such that the voltage level at the gates is kept in a control voltage range of the linear state while the power supply circuit 24 is being charged by the large input current. This charging takes place when the output voltage of the power supply has dropped to a lower threshold.

During this charging, only a portion of the large input current is provided to the power supply circuit since part is bypassed through the switch 13. Thus, the switch allows a remaining portion of the operating current to flow through. This takes place before the power supply circuit is sufficiently charged by that portion of the operating current. Thus the total current through the lamp is substantially same as when the switch is in the fully conductive mode.

Then, when the power supply circuit has been charged and the voltage on the power supply circuit becomes sufficient again, the switch 13 is driven from the linear state back to a fully conductive state. This takes place when the output voltage of the power supply circuit 24 reaches an upper threshold. The power supply circuit is then fully bypassed from the input.

In a standby mode of the lamp, when the smaller standby current is received at the input, the slew rate allows the voltage level provided to the transistor gates to enter a control voltage range corresponding to a fully non-conducive state before the power supply circuit is sufficiently charged by the standby current. Thus, the full standby current is routed to the power supply circuit 24 to be used for charging.

To implement these different slew rate conditions, the buffering capacitor for example has a capacitance in the range 22 nF to 220 nF. It is in a negative feedback path, connected between the output of the comparing circuit and the reference voltage at the inverting input.

The operation of the circuit will now be shown using timing diagrams.

Figure 4:
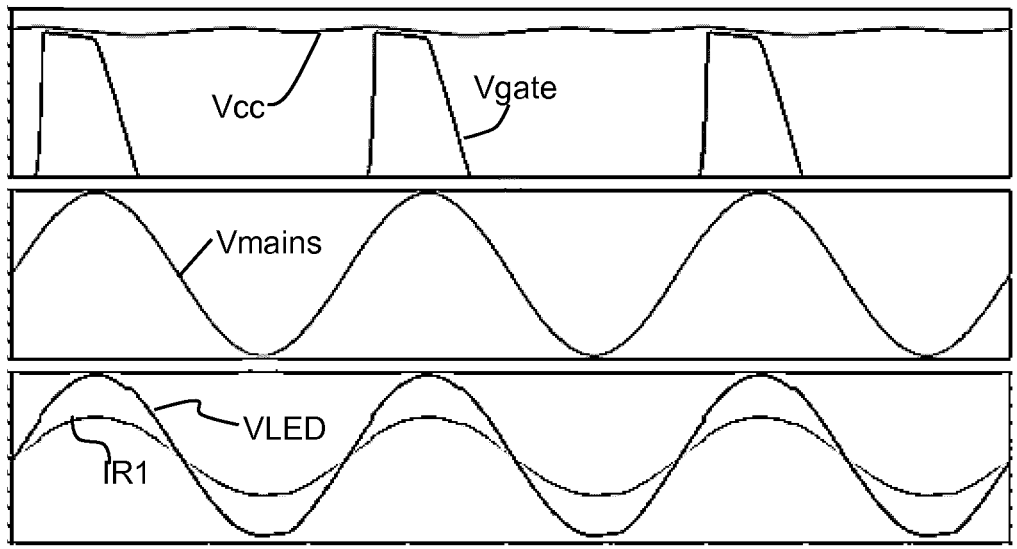
FIG. 4 shows waveforms when the lighting device is in standby mode.

FIG. 4 shows waveforms when the lighting device is in the standby mode.

The plots shown are the power supply circuit output voltage Vcc (which has a target of 18V in this example), the gate voltage Vgate for the two transistors of the switch 13, the (clean) mains input Vmains from the voltage source 10 (e.g. 240V RMS), the load current IR1 drawn by the lighting load (e.g. between −12 mA and +12 mA) and the resulting voltage waveform across the lighting load VLED.

A small ripple can be seen in the waveform VLED and there is a corresponding ripple in the load current IR1, but these ripples are able to be tolerated by lighting units which are not phase cut compatible (e.g. phase cut dimmable), or more generally loads which are not phase-cut compatible.

The high peaks in the signal Vgate correspond to the transistors being conducting i.e. the switch bypassing the power supply circuit. Thus, it can be seen that the switch is non-conducting most of the time, to allow all of the small standby current to flow to the power supply circuit. This non-conducting state will include a time when the switch is operating in its linear state (during the unavoidable transition from on to off and off to on with a low current) and a time when the switch is operating in its fully non-conductive. However, the aim is for the switch to be turned fully off to allow all the available current to pass to the power supply circuit.

When the power supply circuit is to be bypassed, the switch is operated with a fully conductive state (this is when the output voltage of the power supply circuit reaches an upper threshold).

Figure 5:
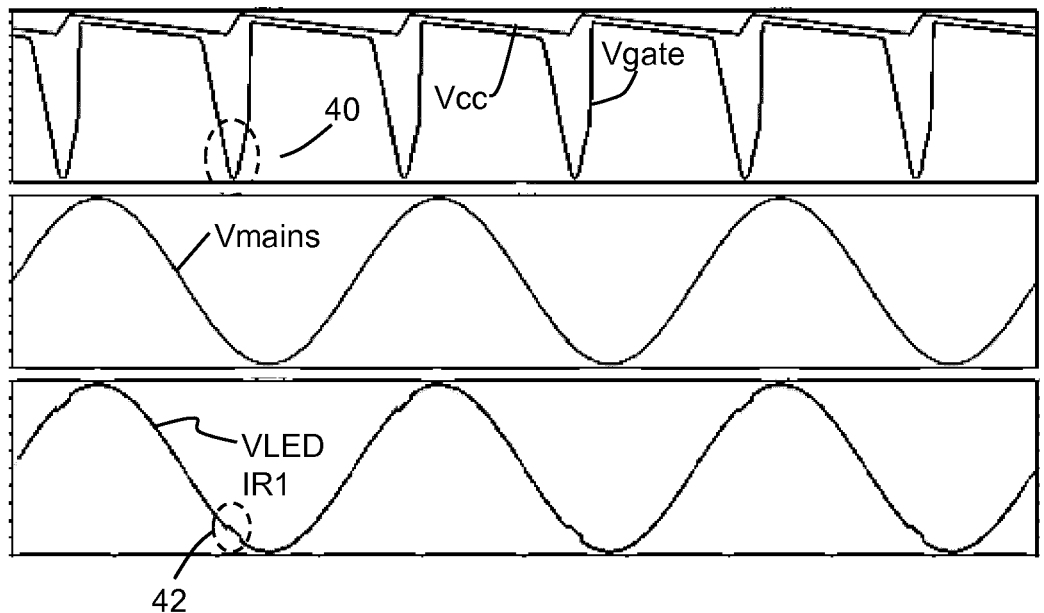
FIG. 5 shows the same waveforms as FIG. 4 when the lighting device is in its operating mode.

FIG. 5 shows the same waveforms when the lighting device is in its operating mode.

When a large operating current is received (e.g. IR1 now extends between −1.5A and +1.5A), a small period of time is needed while the large available current passes to the power supply circuit. Thus, the conductive state is used most of the time, and the switch is turned fully on during this time (the high peaks of Vgate).

Linear control is used when the power supply circuit is to be charged. This linear control is for relatively short durations hence limiting power dissipation. One of the periods of linear control is shown as 40. The voltage across the load and the current again experience minimal disturbance, which is shown as a small drop as 42. Compared with FIG. 1, the voltage and current are not phase cut.

In all cases, the current through the lighting device is not interrupted—it is simply diverted through the power supply circuit, or bypasses the power supply circuit, or portions of both during linear control.

As explained above, the buffering component (capacitor C3) provides control of the linear state of the switch 13. The effect of the value of this capacitor will now be shown using plots for Vgate, Vcc, VLED and VR1. FIGS. 6 to 9 show the plots for the operating current mode of the lighting device (i.e. corresponding to FIG. 5) for different capacitance values.

Figure 6:
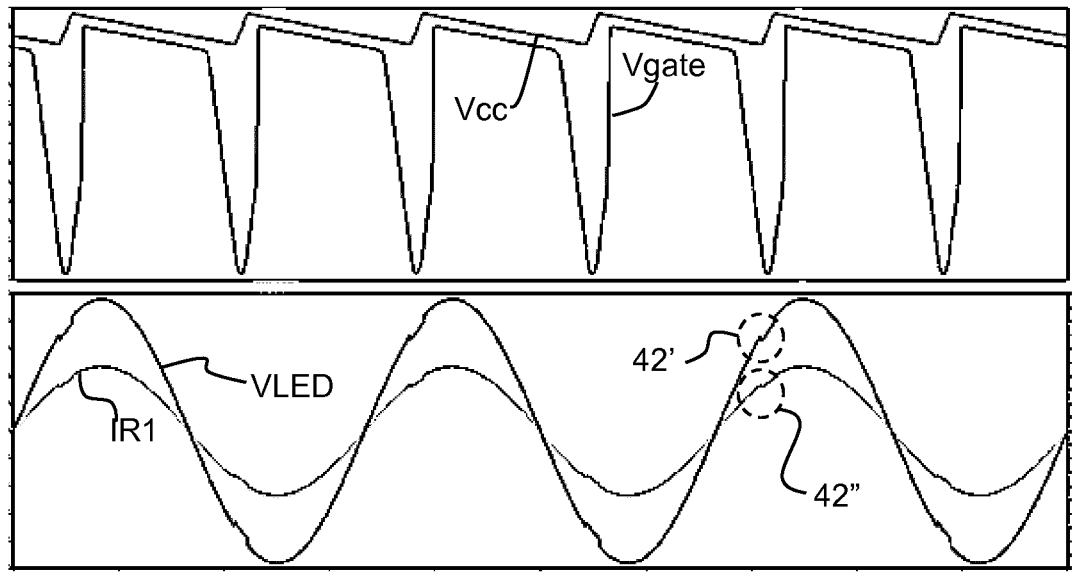
FIG. 6 shows waveforms with a 22 nF buffering component.

FIG. 6 shows the waveforms with a 22 nF buffering component. The capacitance causes a softening of the edges of the switching signals. The gate voltage of the MOSFETs Q1 and Q2 does not reach zero but remains above 3 volts so that they are operating in a linear mode. A very small dip shown in the voltage VLED is shown as 42' and a very small dip in the current IR1 through the load/lamp is shown as 42". However, these waveforms are substantially maintained with a sinusoidal shape without being interrupted to zero, or phase-cut. Therefore a phase-cut incompatible lamp (or other load) can still function.

Figure 7:
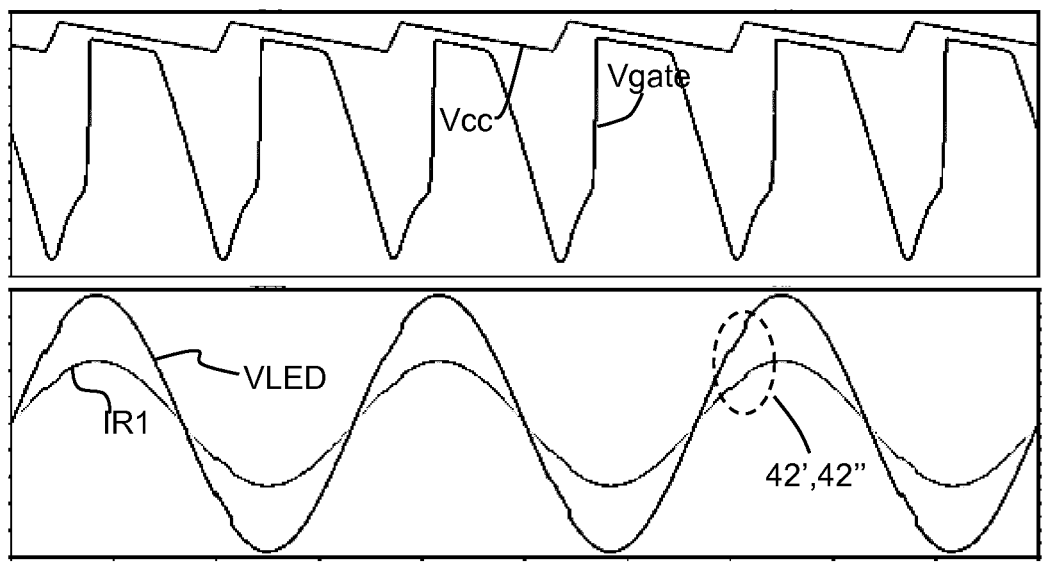
FIG. 7 shows the waveforms of FIG. 6 with a 47 nF buffering component.

FIG. 7 shows the waveforms with a 47 nF buffering component. The transistors stay longer in the linear mode. The edges are softer giving improved EMC. The heat dissipation is higher though, because the transistors are not fully conducting during the linear mode and therefore dissipating energy. The dips as shown in region 42' and 42" are slightly longer than those dips for the 22 nF example of FIG. 6.

Figure 8:
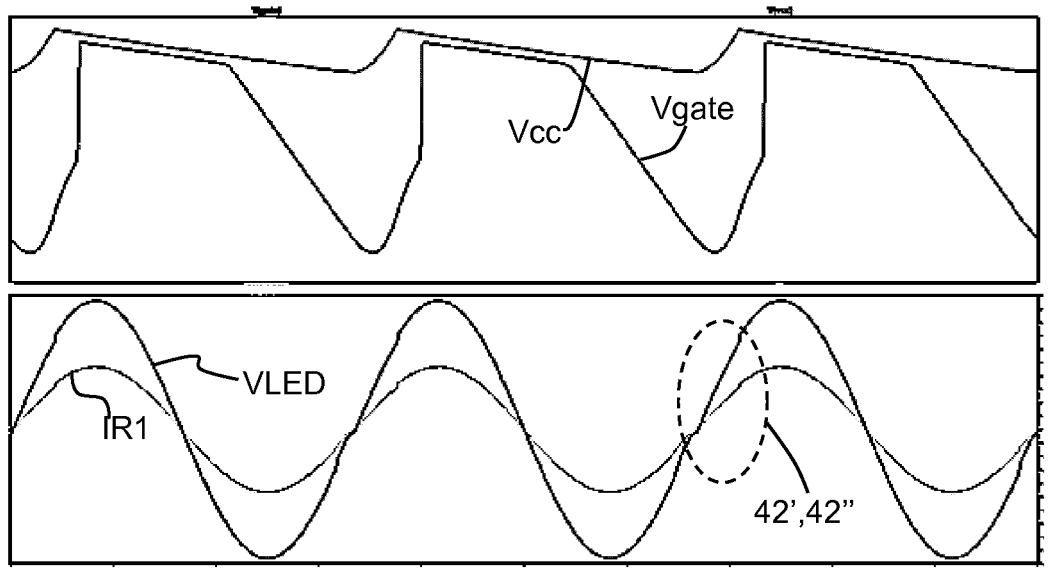
FIG. 8 shows the waveforms of FIG. 6 with a 100 nF buffering component.

FIG. 8 shows the waveforms with a 100 nF buffering component. The transistors stay even longer in the linear mode. The switching frequency is reduced. The dips as shown in regions 42', 42" are a bit longer than those dips for the 47 nF example of FIG. 7.

Figure 9:
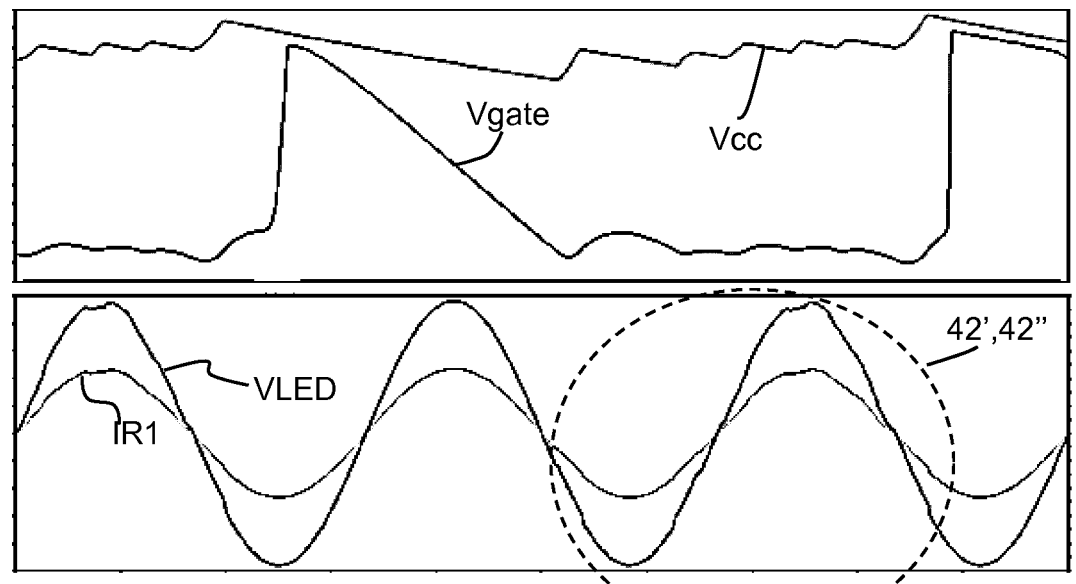
FIG. 9 shows the waveforms of FIG. 6 with a 220 nF buffering component.

FIG. 9 shows the waveforms with a 220 nF buffering component. The transistors stay even longer in the linear mode with a further reduction in switching frequency and a further increase in the duration of the linear mode. This has the best EMC performance but the worst heat dissipation. This is for example suitable for light loads with a low current in the operating mode. The dips in region 42', 42" can be as long as one period of the AC mains, but the waveform still maintains a sinusoidal shape without being interrupted to zero.

Figure 10:
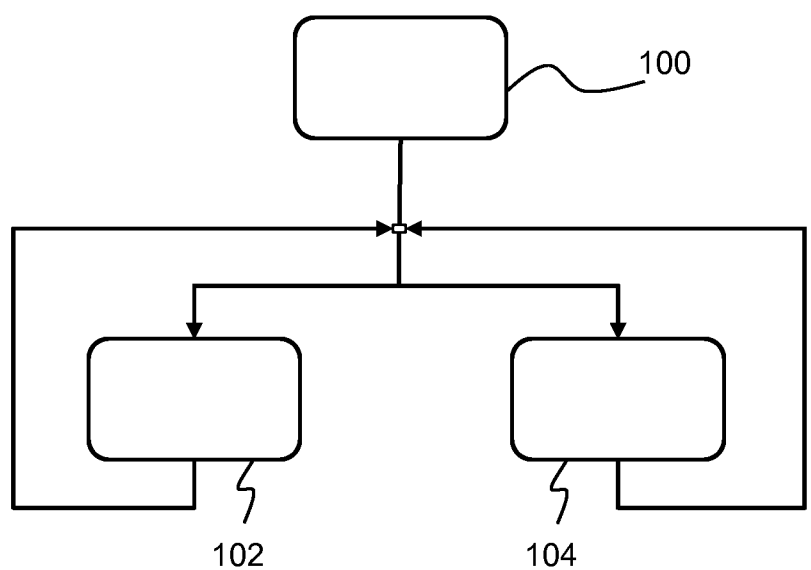
FIG. 10 shows a method of powering a controller circuit which is for controlling an external load.

FIG. 10 shows a method of powering a controller circuit which is for controlling an external load, comprising:

in step 100, receiving energy at an AC input of a power supply circuit; and in a cycle, alternately setting the switch to be conductive to bypass the power supply circuit from the input (step 102) and setting the switch to allow the power supply circuit to obtain power from the input (step 104).

When allowing the power supply circuit to obtain power from the input in step 102, for a sufficient received current (e.g. one which is sufficient to allow discontinuous powering of the controller circuit), the switch is operated to be alternately conductive or to allow the power supply circuit to obtain power from the input by operating in a linear state.

The invention enables an electronic controller apparatus to be connected in series with a load and extract energy without disruption to the voltage waveform. The current is never interrupted completely as in a phase cut power approach. The use of switching transistors in a linear mode for a short period of time achieves smooth waveforms while still having low heat dissipation;

Excellent electromagnetic compatibility is then possible due to the very low electrical noise compared to a phase cut circuit. Avoiding interruption to the output current creates a very low noise profile, with no audible noise. The circuit can also be implemented without a zero-crossing circuit and therefore avoids issues of loss of synchronization. It also avoids the need for large expensive filtering components because of the low electrical noise.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An electronic controller apparatus, adapted to connect in series with an AC supply and an external load, the apparatus comprising:
    a controller circuit for controlling the external load;
    a power supply circuit to power the controller circuit, comprising an AC input for receiving energy, wherein said AC input is adapted to connect in series with the AC supply and the external load; and
    a switch connected across the input and in parallel with the power supply circuit, adapted alternately to be conductive to bypass the power supply circuit from the AC input or to allow the power supply circuit to obtain power from the AC input,
    wherein for a first type of AC supply of a sufficient operating current, the switch is adapted to continue a current of said first type of AC supply by alternately:
        being fully conductive; and
        operating in a linear state to allow the power supply circuit to obtain power from the AC input,
    thereby to allow the sufficient current to flow continuously from said first type of AC supply and through the external load.

2. An apparatus as claimed in claim 1, comprising a rectifier for rectifying the AC input before delivery to the power supply circuit, and the power supply circuit comprises at least one of:
    a storage capacitor;
    a linear power supply; and
    a switched mode power supply.

3. An apparatus as claimed in claim 1, wherein the power supply circuit is connected in series with the external load via the AC input, and said controller circuit is for controlling the external load.

4. An apparatus as claimed in claim 3, wherein the energy is received from an AC current of the external load, and wherein the AC current comprises, for different modes of the external load, a standby current of the external load and an operating current of the external load which is larger than the standby current, and wherein said operating current comprises said first type of AC supply.

5. An apparatus as claimed in claim 4, wherein for the first type of AC supply, the switch is adapted to alternate between:
    the fully conductive state when an output voltage of the power supply circuit reaches an upper threshold, such that the power supply circuit is bypassed from the AC input; and
    the linear state in which the power supply circuit is adapted to obtain a portion of the operating current from the AC input while the switch allows a rest of the operating current to flow through when the output voltage of the power supply reaches a lower threshold.

6. An apparatus as claimed in claim 5, wherein for the first type of AC supply, the duration of the conductive state is larger than the duration of linear state.

7. An apparatus as claimed in claim 4, wherein when the AC current is the standby current, as a second type of AC supply, the switch is adapted to alternate between:
    a fully conductive state when an output voltage of the power supply circuit reaches an upper threshold, such that the power supply circuit is bypassed from the AC input; and
    the linear state and a fully non-conductive state when the output voltage of the power supply reaches a lower threshold, to allow the power supply circuit to obtain power from the AC input,
    wherein the duration of the fully conductive state is smaller than the duration of the linear state and the fully non-conductive state.

8. An apparatus as claimed in claim 7, comprising a feedback circuit for controlling the switch to alternate between the different states.

9. An apparatus as claimed in claim 8, wherein the feedback circuit comprises:
    a voltage sensing circuit to sense a voltage output of the power supply circuit;
    a comparing circuit to compare the sensed voltage with a reference voltage and output a voltage level to operate the switch in the different states; and
    a buffering component in a feedback path of the comparing circuit, wherein said buffering component is adapted to generate a slew rate to the voltage level to the switch.

10. An apparatus as claimed in claim 9, wherein:
    for the first type of AC supply, the buffering component is adapted to generate the slew rate such that the voltage level is kept in a control voltage range of the linear state before the power supply circuit is sufficiently charged by a portion of the operating current;
    for the second type of AC supply, the buffering component is adapted to generate the slew such as to allow the voltage level to enter a control voltage range of the fully non-conducive state before the power supply circuit is sufficiently charged by the standby current; and
    the buffering component comprises a capacitor with capacitance in the range 22 nF to 220 nF connected between the output of the comparing circuit and the reference voltage.

11. An apparatus as claimed in claim 1, wherein the external load comprises a lamp having the standby mode without light emission and the operating mode with light emission.

12. An apparatus as claimed in claim 1, wherein the controller comprises an RF transmission circuit for providing RF control signals to the external load.

13. A lighting system comprising:
    an AC lamp, having a standby mode without light emission and an operating mode with light emission; and
    an apparatus as claimed in claim 1 in series with the lamp and adapted to control a mode of the lamp, wherein the lamp comprises the external load, and thereby receives as the AC input an AC lamp current.

14. A method of powering a controller circuit which is for controlling an external load, wherein the controller circuit is adapted to connect in series with an AC supply and the external load, the method comprising:

receiving energy at an AC input of a power supply circuit, wherein said AC input is adapted to connect in series with the AC supply and the external load; and in a cycle, alternately setting a switch connected across the AC input to be conductive to bypass the power supply circuit from the AC input and setting the switch to allow the power supply circuit to obtain power from the AC input, wherein when allowing the power supply circuit to obtain power from the input, for a first type of AC supply of a sufficient operating current, the method comprises operating the switch to continue a current of said first type of AC supply by alternately:

being conductive; and operating in a linear state to allow the power supply circuit to obtain power from the AC input, thereby to allow the sufficient current to flow continuously from said first type of AC supply and through the external load.

15. A method as claimed in claim 14, comprising receiving energy as an AC current of the external load, and wherein the AC current comprises for different modes of the external load a standby current of the external load and an operating current of the external load which is larger than the standby current, wherein the method comprises alternating the setting of the switch between a conductive state, such that the power supply circuit is bypassed from the AC input, and a control state in which the power supply circuit obtains power from the AC input, wherein when the AC current is a standby current, the duration of the conductive state is smaller than the duration of the control state, and the control state is a fully non-conductive state, and when the AC current is a load operating current, the duration of the conductive state is larger than the duration of the control state, and the control state comprises said operation of the switch in the linear state.

* * * * *